US012809301B2

(12) United States Patent
Segawa et al.

(10) Patent No.: US 12,809,301 B2
(45) Date of Patent: Nov. 24, 2026

(54) ELECTROPHOTOGRAPHIC CLEANING BLADE, PROCESS CARTRIDGE, ELECTROPHOTOGRAPHIC IMAGE FORMING APPARATUS AND URETHANE MOLDED PRODUCT

(71) Applicant: CANON KABUSHIKI KAISHA, Tokyo (JP)

(72) Inventors: Shota Segawa, Shizuoka (JP); Masanori Yokoyama, Shizuoka (JP); Yuichi Kikuchi, Shizuoka (JP); Arihiro Yamamoto, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 19/211,529

(22) Filed: May 19, 2025

(65) Prior Publication Data

US 2025/0362638 A1 Nov. 27, 2025

(30) Foreign Application Priority Data

May 24, 2024 (JP) ................................ 2024-084837

(51) Int. Cl.

| | |
|---|---|
| ***G03G 21/00*** | (2006.01) |
| ***C08G 18/10*** | (2006.01) |
| ***C08G 18/61*** | (2006.01) |
| ***G03G 21/18*** | (2006.01) |

(52) U.S. Cl.

CPC ......... *G03G 21/0017* (2013.01); *C08G 18/10* (2013.01); *C08G 18/61* (2013.01); *G03G 21/1814* (2013.01)

(58) Field of Classification Search

CPC ........... G03G 21/0017; G03G 21/1814; C08G 18/10; C08G 18/61

See application file for complete search history.

(56) References Cited

U.S. PATENT DOCUMENTS

| | | | | |
|---|---|---|---|---|
| 2014/0086653 | A1* | 3/2014 | Tano .................. | G03G 21/0017 399/350 |
| 2018/0039223 | A1* | 2/2018 | Miyagawa ......... | G03G 21/0017 |
| 2021/0200136 | A1 | 7/2021 | Juri et al. | |
| 2022/0334530 | A1* | 10/2022 | Fumita ............... | G03G 21/1814 |
| 2023/0157492 | A1 | 5/2023 | Segawa et al. | |

FOREIGN PATENT DOCUMENTS

| | | | |
|---|---|---|---|
| JP | 7-98558 | A | 4/1995 |
| JP | 2003-186366 | A | 7/2003 |
| JP | 2020-24375 | A | 2/2020 |
| WO | 2024/117207 | A1 | 6/2024 |
| WO | 2024/117220 | A1 | 6/2024 |
| WO | 2024/172019 | A1 | 8/2024 |

* cited by examiner

*Primary Examiner* — Sandra Brase
(74) *Attorney, Agent, or Firm* — Venable LLP

(57) ABSTRACT

An electrophotographic cleaning blade comprising an elastic member comprising a polyurethane and a support member that supports the elastic member, wherein, a storage elastic modulus of the elastic member at a vibration frequency of $1\times10^{-3}$ Hz is 12.0 to 18.0 MPa, in pulse NMR measurement in an environment at 50° C. of a sample sampled from the elastic member, there is a segment with a spin-spin relaxation time ($T2_L$) of 250 to 360 μs, the polyurethane comprises a polyurethane elastomer comprising a polysiloxane segment having a specific structure, and the polysiloxane segment is bonded to a polyurethane skeleton in the polyurethane elastomer.

12 Claims, 1 Drawing Sheet

ELECTROPHOTOGRAPHIC CLEANING BLADE, PROCESS CARTRIDGE, ELECTROPHOTOGRAPHIC IMAGE FORMING APPARATUS AND URETHANE MOLDED PRODUCT

BACKGROUND

Field of the Technology

The present disclosure relates to a cleaning blade, a process cartridge, an image forming apparatus and a urethane molded product used in an electrophotographic device.

Description of the Related Art

In an electrophotographic device, a cleaning member is provided in order to remove the residual toner on the surface of an image bearing member or an intermediate transfer member after a toner image is transferred from the image bearing member such as a photosensitive member and the intermediate transfer member to a transfer target member. Hereinafter, the image bearing member and the intermediate transfer member will be referred to as a to-be-cleaned member. One of these cleaning members is a cleaning blade.

In recent years, with the increased number of sheets that can be printed due to a prolonged lifespan of electrophotographic devices, there has been a demand for cleaning blades that can achieve high-level cleaning performance for a long time. In order to prolong the lifespan, it is necessary to reduce abrasion at a part of a photosensitive drum which is a to-be-cleaned member, where it comes into contact with the cleaning blade.

In this regard, Japanese Patent Laid-Open No. H07-098558 discloses that the abrasion of a photosensitive drum can be reduced using a soft cleaning blade whose hardness is a certain value or less.

SUMMARY

However, in recent years, toner has become spherical and process speed has increased, and thus cleaning defects are likely to occur in a soft cleaning blade. In consideration of this, it is conceivable to set the hardness of the cleaning blade to a level low enough to reduce abrasion of the photosensitive drum but high enough to prevent the toner from slipping through.

In addition, the elastic member constituting the cleaning blade is likely to lose hardness due to moisture absorption in a high humidity environment. Therefore, it is necessary to control the hardness of the cleaning blade as described above and perform design in consideration of the decrease in hardness due to moisture absorption, which results in a narrow range of usable hardness. Therefore, it is difficult to achieve both excellent cleaning performance and reduction of drum abrasion in order to prolong the lifespan.

The present disclosure is directed to provide a cleaning blade that has a long lifespan and can stably exhibit excellent cleaning performance in a high-speed system. Specifically, the present disclosure is directed to provide a cleaning blade that is less likely to lose hardness even in a high humidity environment by reducing moisture absorption and has excellent cleaning performance.

In addition, the present disclosure is directed to provide a process cartridge comprising the cleaning blade. Thereby, it is possible to contribute to prolonging the lifespan of the cartridge. In addition, the present disclosure is directed to provide an electrophotographic image forming apparatus comprising the cleaning blade. In addition, the present disclosure is directed to provide a urethane molded product that is less likely to absorb moisture and exhibits little change in hardness due to a change in humidity.

According to at least one aspect of the present disclosure, there is provided an electrophotographic cleaning blade comprising:

an elastic member comprising a polyurethane, and a support member that supports the elastic member, the electrophotographic cleaning blade cleans a surface of a to-be-cleaned member by bringing a part of the elastic member into contact with the surface of the to-be-cleaned member that is moving, wherein, in an environment at 24° C., a storage elastic modulus of the elastic member at a vibration frequency of $1\times10^{-3}$ Hz is 12.0 to 18.0 MPa, in pulse NMR measurement in an environment at 50° C. of a sample sampled from the elastic member, there is a segment with a spin-spin relaxation time ($T2_L$) of 250 to 360 μs, the polyurethane comprises a polyurethane elastomer, the polyurethane elastomer comprises a polysiloxane segment having a structure represented by the following Formula (1), the polysiloxane segment is bonded to a structure comprising a polyurethane skeleton in the polyurethane elastomer, and a number I of structures represented by Formula (1) per one polysiloxane segment is 7 to 195:

(1)

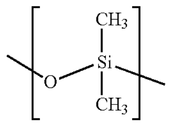

According to at least one aspect of the present disclosure, there is provided a process cartridge comprising the above electrophotographic cleaning blade and a to-be-cleaned member.

In addition, according to at least one aspect of the present disclosure, there is provided an electrophotographic image forming apparatus comprising the above electrophotographic cleaning blade and a to-be-cleaned member.

According to at least one aspect of the present disclosure, there is provided a urethane molded product comprising polyurethane, wherein a storage elastic modulus of the polyurethane at a vibration frequency of $1\times10^{-3}$ Hz in an environment at 24° C. is 12.0 to 18.0 MPa, in pulse NMR measurement in an environment at 50° C. of a sample sampled from the urethane molded product, there is a segment with a spin-spin relaxation time ($T2_L$) of 250 to 360 μs, the polyurethane comprises a polyurethane elastomer, the polyurethane elastomer comprises a polysiloxane segment having a structure represented by following Formula (1), the polysiloxane segment is bonded to a structure comprising a polyurethane skeleton in the polyurethane elastomer, and a number I of structures represented by Formula (1) per one polysiloxane segment is 7 to 195:

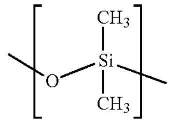

(1)

According to one aspect of the present disclosure, it is possible to provide a cleaning blade that is less likely to lose hardness even in a high humidity environment by reducing moisture absorption and has excellent cleaning performance. In addition, according to another aspect of the present disclosure, it is possible to provide a urethane molded product that is less likely to absorb moisture and exhibits little change in hardness due to a change in humidity.

In addition, according to another aspect of the present disclosure, it is possible to provide a process cartridge and an electrophotographic image forming apparatus which comprise the cleaning blade.

Features of the present disclosure will become apparent from the following description of embodiments with reference to the attached drawings. The following description of embodiments are described by way of example.

DESCRIPTION OF THE EMBODIMENTS

Figure 1:
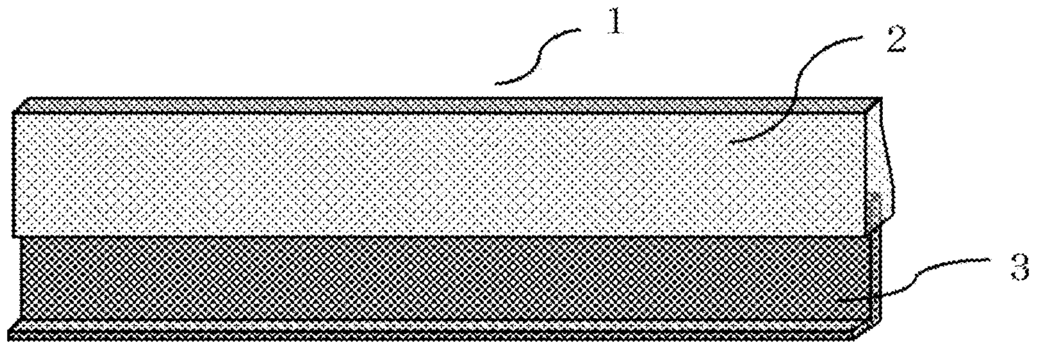
FIG. 1 is a schematic perspective view of an electrophotographic cleaning blade according to one aspect of the present disclosure.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

Examples of members to be cleaned to which an electrophotographic cleaning blade according to one aspect of the present disclosure (hereinafter simply referred to as a "cleaning blade") is applied include image bearing members such as photosensitive members and endless belts such as intermediate transfer belts. Hereinafter, an embodiment of a cleaning blade according to one aspect of the present disclosure will be described in detail using an image bearing member as an example of a to-be-cleaned member, but the present disclosure is not limited thereto. In addition, in the following description, components having the same function will be denoted with the same reference numerals in the drawings, and descriptions thereof will be omitted in some cases.

Configuration of Cleaning Blade

The cleaning blade comprises an elastic member comprising polyurethane and a support member that supports the elastic member, and the electrophotographic cleaning blade cleans a surface of a to-be-cleaned member by bringing a part of the elastic member into contact with the surface of the to-be-cleaned member that is moving. The polyurethane comprises a polyurethane elastomer.

FIG. 1 is a schematic perspective view of a cleaning blade 1 according to one aspect of the present disclosure. The cleaning blade 1 comprises an elastic member 2 and a support member 3 that supports the elastic member 2.

Figure 2:
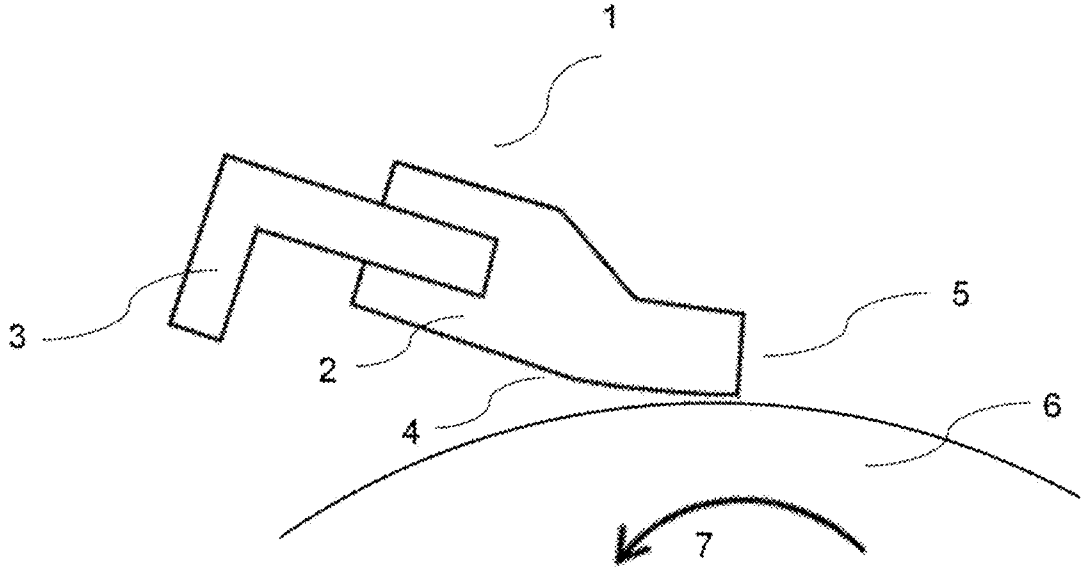
FIG. 2 is a diagram showing a state in which an edge of a cleaning blade is brought into contact with a to-be-cleaned member when a process cartridge is stationary.

FIG. 2 is a schematic cross-sectional view showing an example of a state in which a cleaning blade according to one aspect of the present disclosure is in contact with a to-be-cleaned member. The elastic member 2 has a main surface 4 that faces a to-be-cleaned member 6 and a tip surface 5 that forms a tip side edge together with the main surface 4. Reference numeral 7 indicates a direction in which the to-be-cleaned member rotates.

Storage Elastic Modulus

In an environment at 24° C., the elastic member constituting the cleaning blade has a storage elastic modulus of 12.0 to 18.0 MPa at a vibration frequency of $1\times10^{-3}$ Hz. The storage elastic modulus at a vibration frequency of $1\times10^{-3}$ Hz can be measured using a viscoelasticity measurement device according to the following method.

The vibration frequency of $1\times10^{-3}$ Hz corresponds to a frequency at which a nip is formed between the cleaning blade and the to-be-cleaned member, and the storage elastic modulus at the frequency is related to a nip width. When the storage elastic modulus is set to 12.0 to 18.0 MPa, it is possible to form an appropriate nip and exhibit high cleaning performance.

The storage elastic modulus of the elastic member at a vibration frequency of $1\times10^{-3}$ Hz is preferably 12.5 to 17.0 MPa and more preferably 13.0 to 16.0 MPa.

Reducing Moisture Absorption

It is likely for the elastic member constituting the cleaning blade to cause a decrease in hardness due to moisture absorption in a high humidity environment. The decrease in hardness reduces a contact pressure of a cleaning blade tip and causes cleaning defects. Therefore, in order to reduce cleaning defects, it is important to reduce a decrease in hardness by reducing moisture absorption of the elastic member.

A configuration in which a dense crosslinked structure and the bond between polyurethane and silicone structures coexist in the elastic member can reduce moisture absorption. That is, the elastic member has a silicone structure within a dense crosslinked structure of the polyurethane.

When the elastic member has a dense crosslinked structure, it is possible to reduce the space for moisture to enter. In addition, since the bond between polyurethane and silicone structures reduces compatibility with moisture, it is possible to make it difficult for moisture to enter the elastic member. In this case, since the dense crosslinked structure narrows the space inside the urethane, and the silicone structure bonded to the polyurethane fills this narrow space, it is possible to synergistically prevent moisture from entering and effectively reduce moisture absorption. For example, it is preferable for the elastic member to have a configuration in which a dense crosslinked structure and a silicone side chain structure coexist.

Japanese Patent Laid-Open No. 2003-186366 discloses a configuration in which a siloxane component is fixed in a urethane elastomer. On the other hand, since the present disclosure has a configuration in which the crosslink density of the polyurethane is increased and the polyurethane and silicone structures are bonded, a better moisture absorption reduction effect can be obtained compared to a configuration in which a siloxane component is simply fixed.

Crosslink Density

The crosslink density of polyurethane can be estimated by the spin-spin relaxation time ($T2_L$). The spin-spin relaxation time correlates with the molecular mobility of the polyurethane, and the molecular mobility becomes lower as the spin-spin relaxation time becomes shorter. A lower molecular mobility indicates a dense crosslink structure. Therefore, the crosslink density of polyurethane can be indirectly measured by the spin-spin relaxation time.

A T2 relaxation curve (free induction decay curve) is obtained by measuring the spin-spin relaxation time T2 (transverse relaxation time) of blade rubber according to pulse NMR measurement.

In the present disclosure, in pulse NMR measurement in an environment at 50° C. of a sample sampled from the elastic member, there is a segment with a spin-spin relaxation time ($T2_L$) of 250 to 360 μs.

That is, the elastic member is formed of a polyurethane elastomer comprising a polyurethane segment with a spin-spin relaxation time of 250 to 360 μs.

The spin-spin relaxation time T2 is measured by a solid echo method using a pulsed NMR device. Specifically, a T2 relaxation curve is obtained in the pulse NMR measurement. The obtained T2 relaxation curve is separated into two components according to the length of the relaxation time. In a specific manner, the T2 relaxation curve is separated into two components by curve fitting to a formula to be described below. Of the two separated components, $T2_L$ is the T2 relaxation time of the component with a long relaxation time, and $T2_S$ is the T2 relaxation time of the component with a short relaxation time.

The component with a long relaxation time is assumed to correspond to a soft segment of the polyurethane elastomer. In addition, the component with a short relaxation time is assumed to correspond to the hard segment. Here, in the present disclosure, the hard segment is a component with low molecular mobility at or near the crosslinking point such as an aggregated crystal component of urethane bonds, a isocyanurate bond, polymeric diphenylmethane diisocyanate (polymeric MDI), and trimethylolpropane. In addition, the soft segment is a segment with high molecular mobility between the crosslinking points.

A more specific method of measuring $T2_L$ using a pulsed NMR device will be described below.

The elastic member comprises polyurethane. The polyurethane may comprise a polyurethane elastomer composed of a hard segment and a soft segment.

If the spin-spin relaxation time ($T2_L$) is shorter than 250 μs, the crosslink density becomes too high, the flexibility of the cleaning blade disappears, and the contact position with the to-be-cleaned member becomes unstable.

When there are segments with a $T2_L$ of 250 to 360 μs, it is possible to achieve both reduction of moisture absorption due to a dense crosslinked structure and stable contact with the to-be-cleaned member. If $T2_L$ is 320 μs or less, this is preferable because it more effectively reduces moisture absorption.

That is, in pulse NMR measurement in an environment at 50° C. of a sample sampled from the elastic member, preferably, there is a segment with a spin-spin relaxation time ($T2_L$) of 250 to 320 μs, more preferably, there is a segment with a $T2_L$ of 260 to 300 μs, and still more preferably, there is a segment with a $T2_L$ of 270 to 290 μs.

The spin-spin relaxation time ($T2_L$) of the soft segment can be controlled to be within the above range, for example, by increasing the concentration of the crosslinking agent in the raw material composition of the elastic member.

Silicone Side Chain

The polyurethane elastomer comprises a polysiloxane segment having a structure represented by following Formula (1).

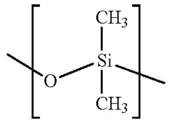

(1)

The polysiloxane segment having the structure represented by Formula (1) is bonded to a structure comprising a polyurethane skeleton in the polyurethane elastomer. The number I of structures represented by Formula (1) per polysiloxane segment is 7 to 195.

In the polysiloxane segment, the structures represented by Formula (1) may be continuous, or other siloxane structures may be present therebetween.

Examples of the bond between the structure represented by Formula (1) and the structure comprising a polyurethane skeleton include the following structure. In the following structure, R indicates a hydrocarbon having 1 to 10 (preferably 1 to 5) carbon atoms. —O— on the left side is bonded to the structure represented by Formula (1), and "*" indicates a binding segment with the polyurethane skeleton.

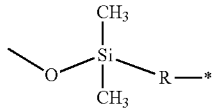

The polyurethane elastomer may have an end that is not bonded to the structure comprising a polyurethane skeleton. Examples of ends that are not bonded to the structure comprising a polyurethane skeleton include the following structure. —O— on the left side is bonded to the structure represented by Formula (1).

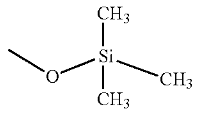

In addition, the end that is not bonded to the structure comprising a polyurethane skeleton may have the following structure comprising a hydroxyl group. In the following structure, R indicates a hydrocarbon having 1 to 10 (preferably 1 to 5) carbon atoms. The structure shows, for example, the state when a silicone oil modified with carbinol at both ends is used for the polysiloxane segment, and one end is not bonded to the polyurethane skeleton.

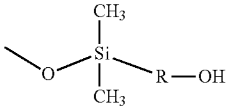

When the polyurethane elastomer having a highly crosslinked structure comprises a polysiloxane segment having the structure represented by Formula (1), it is possible to reduce moisture absorption.

The polyurethane elastomer preferably comprises 0.5 to 15 mass % of the structure represented by Formula (1). The polyurethane elastomer more preferably comprises 0.8 to 12 mass % and still more preferably 1 to 10 mass % of the structure represented by Formula (1).

It is preferable that the polyurethane elastomer comprise 0.5 mass % or more of the structure represented by Formula (1) because a sufficient moisture absorption reduction effect can be obtained. In addition, it is preferable that the polyurethane elastomer comprise 15 mass % or less of the structure represented by Formula (1) because the proportion of the polyurethane elastomer in the elastic member can be sufficiently maintained, and conformability to the drum and abrasion resistance required for a cleaning blade can be obtained.

In Formula (1), I is an integer of 7 to 195. I is preferably an integer of 40 to 160.

The polysiloxane segment is preferably bonded to the polyurethane skeleton via a structure represented by the following Formula (2).

(2)

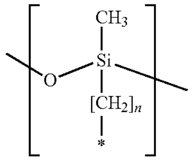

(in Formula (2), n is an integer of 1 to 5, and "*" indicates a binding segment with the polyurethane skeleton).

The number m of structures represented by Formula (2) per polysiloxane segment is preferably 1 to 10.

That is, it is preferable that the structure of Formula (2) be present between the structures represented by Formula (1) and the polysiloxane segment be bonded to the polyurethane skeleton via the structure of Formula (2). Here, when m=1 to 10, and a plurality of structures of Formula (2) are present in the polysiloxane segment, the structures of Formula (2) may be present in blocks or randomly. For example, the structure represented by Formula (1) may be bonded to the left and right of the structure represented by Formula (2), and the structures of Formula (2) may be present continuously.

—O— on the left side of the structure represented by Formula (2) can be bonded to Si in the structure represented by Formula (1) or the structure represented by Formula (2). Si in the structure represented by Formula (2) can be bonded to —O— in the structure represented by Formula (1) or the structure represented by Formula (2). The repeating structures of siloxane may be bonded to both sides of the structure represented by Formula (2).

The polysiloxane segment has a form that is bonded to the structure comprising a polyurethane skeleton such as the structure represented by Formula (2). Since this bond form allows the polydimethylsiloxane segment to be incorporated into the crosslinked structure of the polyurethane elastomer, it is possible to more efficiently prevent moisture from entering the polyurethane.

In Formula (2), m is preferably 2 to 10, and n is preferably an integer of 1 to 3.

Japanese Patent Laid-Open No. 2020-024375 discloses a urethane elastomer comprising a siloxane component. On the other hand, in the present disclosure, when a configuration in which a siloxane component is fixed in the urethane elastomer is used, a better moisture absorption reduction effect can be obtained.

When a polysiloxane to be described below is used as the material for the elastic member, it is possible to obtain a polyurethane elastomer having a polysiloxane segment having the structure represented by Formula (1), in which the polysiloxane segment is bonded to the structure comprising a polyurethane skeleton.

As the polysiloxane, various modified silicone oils can be used. Among these, carbinol-modified silicone oils with primary hydroxyl groups which have high reactivity with isocyanate to be described below and are easily fixed in the polyurethane elastomer are preferable.

The carbinol-modified silicone oils are not particularly limited, and both-end modified types and side-chain modified types can be used.

For example, when a carbinol-modified silicone oil modified at both ends is used, the structure comprising a polyurethane skeleton may be bonded to both ends of the structure represented by Formula (1), or the structure comprising a polyurethane skeleton may be bonded to only one end.

Examples of the bond between the structure represented by Formula (1) and the structure comprising a polyurethane skeleton include the following structure. In the following structure, R indicates a hydrocarbon having 1 to 10 (preferably 1 to 5) carbon atoms. —O— on the left side is bonded to the structure represented by Formula (1), and "*" indicates a binding segment with the polyurethane skeleton.

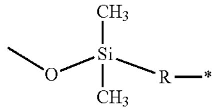

On the other hand, examples of ends that are not bonded to the structure comprising a polyurethane skeleton include the following structure. —O— on the left side is bonded to the structure represented by Formula (1).

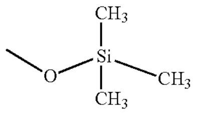

In addition, the end that is not bonded to the structure comprising a polyurethane skeleton may have the following structure comprising a hydroxyl group. In the following structure, R indicates a hydrocarbon having 1 to 10 (preferably 1 to 5) carbon atoms. The structure shows, for example, the state when a silicone oil modified with carbinol at both ends is used for the polysiloxane segment, and one end is not bonded to the polyurethane skeleton.

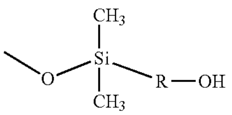

When a carbinol-modified silicone oil modified at the side chain is used, the structure represented by Formula (1) can be bonded to the polyurethane skeleton via the structure represented by Formula (2).

The polysiloxane segment preferably has a structure in which polysiloxane comprising a structure represented by the following Formula (3) is urethane-bonded.

(3)

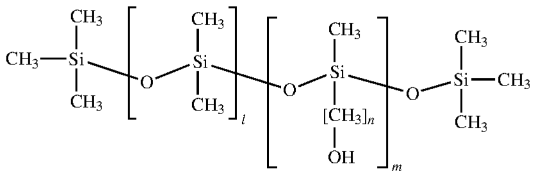

(in Formula (3), I and m are an average number of moles added, I is 7 to 195, m is 1 to 10, and n is an integer of 1 to 5, siloxane structures represented by (—O—Si$(CH_3)_2$—) and structures represented by (—O—Si$(CH_3)((CH_2)_nOH)$—) may be arranged in a block copolymerization or random copolymerization manner).

When the polysiloxane segment has a structure in which the polysiloxane comprising the structure represented by Formula (3) is urethane-bonded, a moisture absorption reduction effect is further improved. This is speculated to be due to the presence of siloxane near the urethane skeleton. In Formula (3), I is preferably an integer of 40 to 160, m is preferably an integer of 2 to 10, and n is preferably an integer of 1 to 3.

The polysiloxane segment may be bonded to the polyurethane skeleton via the structure represented by the following Formula (4).

(4)

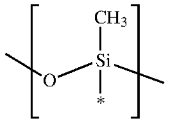

(in Formula (4), "*" indicates a polyurethane skeleton)

—O— on the left side of the structure represented by Formula (4) is bonded to Si in the structure represented by Formula (1). Si in the structure represented by Formula (4) is bonded to —O— in the siloxane structure. That is, the repeating structures of siloxane may be bonded to both sides of the structure represented by Formula (4).

Method of Measuring Storage Elastic Modulus

The storage elastic modulus can be obtained by measuring the dynamic viscoelasticity of a sample under conditions in which the frequency and temperature are set using a dynamic viscoelasticity device, and creating a master curve at a reference temperature from measurement data.

The master curve is created based on the time-temperature shift rule. The horizontal axis represents frequency, and the vertical axis represents elastic modulus. The master curve can be created by shifting frequency dispersion data measured at each temperature along the horizontal axis so that it overlaps reference temperature data.

From the obtained master curve, for example, curve fitting is performed based on the generalized Maxwell model and formulating is performed, and thus the storage elastic modulus of the elastic member at $1\times10^{-3}$ Hz can be calculated.

Method of Measuring Crosslink Density

The crosslink density of the polyurethane can be indirectly measured according to the spin-spin relaxation time in pulsed NMR.

When the crosslink density is low, the molecular mobility of the segment is high and relaxation takes time, and thus the spin-spin relaxation time ($T2_L$) becomes long.

The spin-spin relaxation time (T2) is measured by a solid echo method using a pulsed NMR device.

The pulsed NMR device is a device for evaluating the mobility of polymer molecules of rubber or the like from the mobility (relaxation time) of hydrogen atoms in the molecular chain, and in the present embodiment, the solid echo method is used as the sequence. The solid echo method using the pulsed NMR device itself can be a known method, and is not particularly limited.

A T2 relaxation curve (free induction decay curve) is obtained by measuring the spin-spin relaxation time T2 (transverse relaxation time) according to pulse NMR measurement.

In the present embodiment, the T2 relaxation curve is separated into two components according to the length of the relaxation time. In a specific manner, the T2 relaxation curve is separated into two components by curve fitting to the following formula, and the T2 relaxation time ($T2_L$) of the component with a long relaxation time and the T2 relaxation time ($T2_S$) of the component with a short relaxation time are calculated.

$$M(t) = A_L\exp\left[-\left(\frac{t}{T2_L}\right)^{mi}\right] + A_S\exp\left[-\left(\frac{t}{T2_S}\right)^{mi}\right]$$

M(t): macroscopic magnetization $A_L$: the intensity of the component with a long relaxation time at t=0

$T2_L$: the T2 relaxation time of the component with a long relaxation time $A_S$: the intensity of the component with a short relaxation time at t=0

$T2_S$: the T2 relaxation time of the component with a short relaxation time mi: Weibull coefficient Method of Measuring Siloxane Component The method of analyzing a siloxane component can be performed according to the following method. For example, a method using trimethyl orthoformate as a methoxy derivatizing agent is known. Trimethyl orthoformate, methanol, sulfuric acid and an elastic member are mixed and reacted at a reflux temperature for several hours, and thus siloxane segments can be decomposed into siloxane units. This sample is analyzed through GCMS or the like, and thus the structure can be analyzed and quantified.

More specifically, analysis can be performed as follows.

The structure represented by Formula (1) can be quantified by the following method.

524 mg of a silicone oil (product name "KF-96A-100cs," commercially available from Shin-Etsu Chemical Co., Ltd.) as a standard sample, 272 mg of sulfuric acid, 28.4 g of trimethyl orthoformate, and 8.75 g of methanol are mixed, and the mixture is reacted at a reflux temperature for 5 hours. The solution after the reaction is diluted with a solvent to prepare four levels of samples with different concentrations. The four levels of samples are analyzed through GCMS and a calibration curve is created using the peak intensity and the concentration of the Si—O component.

Next, a measurement sample is cut out from the center of the elastic member of the cleaning blade.

524 mg of the sample is mixed with 272 mg of sulfuric acid, 28.4 g of trimethyl orthoformate, and 8.75 g of methanol, and the mixture is reacted at a reflux temperature for 5 hours. The supernatant liquid after the reaction is sampled and analyzed through GCMS. The mass % of the structure represented by Formula (1) in the polyurethane elastomer is calculated from the peak intensity of the Si—O component and the calibration curve.

Regarding the structure represented by Formula (2), the sample after the reaction can be analyzed through 1H-NMR to estimate the structure. When the polyurethane elastomer has the structure represented by Formula (2), that is, when a side chain-modified silicone oil is used, two methoxy groups and one methyl group are bonded to Si at the end of the polyurethane elastomer in the structure.

On the other hand, when an end-modified silicone oil is used, one methoxy group and two methyl groups are bonded to Si at the end of the polyurethane elastomer in the structure. The structure can be inferred from the peak intensity ratio of the two bonds.

Isocyanurate Bond

When the crosslink density of the polyurethane increases, the elastic modulus of the elastic member tends to increase, the nip that comes into contact with the to-be-cleaned member is narrowed, and this is disadvantageous for the contact stability. In order to increase the crosslink density and prevent the elastic modulus from becoming too high, it is conceivable to reduce the amount of rigid components in the polyurethane elastomer.

As a rigid component, it is preferable to minimize the number of isocyanurate bonds and to have rich urethane bonds. Specifically, in FT-IR measurement of the elastic member using diamond as ATR crystals, the value of the peak intensity at 1,415 $cm^{-1}$ to the peak intensity at 1,538 $cm^{-1}$ (the value of the peak intensity at 1,415 $cm^{-1}$/the peak intensity at 1,538 $cm^{-1}$) is preferably 0.50 to 0.65.

The peak at 1,415 $cm^{-1}$ in the FT-IR analysis of the elastic member using diamond as ATR crystals is the peak corresponding to the isocyanurate ring. On the other hand, the peak at 1,538 $cm^{-1}$ is a peak corresponding to the NH deformation angle of the urethane bond. That is, a value of the peak intensity at 1,415 $cm^{-1}$/the peak intensity at 1,538 $cm^{-1}$ in a range of 0.50 to 0.65 indicates that there are few isocyanurate bonds in the elastic member.

When the value of the peak intensity at 1,415 $cm^{-1}$/the peak intensity at 1,538 $cm^{-1}$ (peak intensity ratio) is larger than 0.65, this indicates that there are a large number of isocyanurate bonds in the elastic member. When the peak intensity ratio is 0.50 to 0.65, it is possible to obtain an elastic member which has a storage elastic modulus that is not too large and has excellent contact stability with the to-be-cleaned member.

In order to set the value of the peak intensity at 1,415 $cm^{-1}$/the peak intensity at 1,538 $cm^{-1}$ within the above specific range, a method of reducing the number of isocyanurate bonds and making the product urethane-rich may be exemplified. Specific examples thereof include using a urethanization catalyst instead of a catalyst that promotes isocyanurate formation, bringing the mixing ratio of —NCO and —OH in the prepolymer close to 1, and keeping the reaction temperature when prepolymer materials are reacted at 100° C. or lower.

Polymeric MDI

When the side of the cleaning blade that comes into contact with the surface of the to-be-cleaned member is defined as a tip side of the cleaning blade, the elastic member has a plate shape having, at least on the tip side, a main surface (4) that faces the to-be-cleaned member and a tip surface (5) that forms a tip side edge together with the main surface. Here, it is assumed that a third line segment is drawn on the tip surface parallel to the tip side edge at a distance of 0.5 mm from the tip side edge. Here, the length of the third line segment is denoted as L', and points ⅛L', ½L', and ⅞L' from one end side on the third line segment are denoted as P0', P1', and P2', respectively.

Samples sampled at each of P0', P1' and P2' are heated and vaporized in an ionization chamber, and heated to 1,000° C. at a ramp rate of 10° C./s using a direct sample introduction type mass spectrometer that ionizes sample molecules. The amount of all ions detected, which is obtained as a result, is denoted as M1, and the integrated intensity of the peak of the extracted ion thermogram corresponding to the m/z value in a range of 380.5 to 381.5 derived from the polymeric MDI is denoted as M2. In this case, the M2/M1 is preferably less than 0.0010.

As the isocyanate, it is preferable to use 4,4'-MDI which has high reactivity and in which two isocyanate groups have equal reactivity. On the other hand, it is preferable to minimize the used amount of the polymeric MDI, which is a trifunctional MDI, as described above, and it is particularly preferable not to use it at all. Specifically, the M2/M1 is preferably less than 0.0010. When the M2/M1 satisfies the above specific range, the storage elastic modulus is likely to fall within a favorable range.

The M2/M1 is more preferably 0.0009 or less. A smaller M2/M1 is preferable, and the lower limit is not particularly limited, and is preferably 0.0000 or more.

When the M2/M1 is 0.0010 or more, the storage elastic modulus tends to be large due to the stiffness of the polymeric MDI.

In addition, it is preferable to minimize the amount of crystal structures in the polyurethane. Specifically, it is preferable to minimize the amount of materials that easily form crystal structures such as 1,4-butanediol and to use a rich amount of crosslinking agents such as trimethylolpropane. Crosslinking agents such as trimethylolpropane make it easier to create distances between urethane bonds, and make it difficult for crystal structures to form.

High Crosslink Density

Examples of methods of increasing the crosslink density include increasing the concentration of the crosslinking agent in the raw material composition of the elastic member. In consideration of the storage elastic modulus, the concentration of the crosslinking agent in the raw material composition of the elastic member is preferably 0.30 to 0.70 mmol/g, more preferably 0.40 to 0.61 mmol/g, and still more preferably 0.50 to 0.60 mmol/g.

Hereinafter, the method of calculating the concentration of the crosslinking agent will be described. For example, quantification can be performed through pyrolysis GC/MS.

Polyhydric alcohols are detected through pyrolysis GC/MS. Measurement conditions are as follows.

Device:

- Pyrolysis device: EGA/PY-3030D (product name, commercially available from Frontier Laboratories Ltd.)
- Gas chromatography device: TRACE1310 gas chromatograph (product name, commercially available from Thermo Fisher Scientific Inc.)
- Mass spectrometer: ISQLT (product name, commercially available from Thermo Fisher Scientific Inc.)
- Pyrolysis temperature: 500° C.
- GC column: inner diameter 0.25 mm×30 m stainless steel capillary column stationary phase 5% phenyl polydimethylsiloxane
- Heating conditions: maintained at 50° C. for 3 minutes and heated to 300° C. at 8° C./min MS conditions: mass range m/z 10 to 650

Scan speed: 1 second/scan

The type of polyhydric alcohol is identified through GC/MS. A calibration curve is created by GC analysis of the identified polyhydric alcohol species with known concentrations, quantification is performed from the GC peak area ratio, and the concentration of the crosslinking agent in the raw material composition is calculated.

When the elastic member is left in an environment at a temperature of 24° C. and a relative humidity of 50% for 24 hours or longer, the hardness is preferably 60.0 to 90.0 and more preferably 70.0 to 80.0. The hardness is the international rubber hardness (IRHD) and is a value measured using a hardness tester according to the international rubber hardness test M method specified in JIS K 6253.

When the hardness of the elastic member after it is left in an environment at a temperature of 24° C. and a relative humidity of 50% for 24 hours or longer is the initial hardness, and the hardness of the elastic member after it is moved to an environment at a temperature of 24° C. and a relative humidity of 95% and left for 24 hours or longer is the hardness after aging, the hardness decrease rate calculated by the following formula is preferably 0.20 to 0.90% and more preferably 0.30 to 0.85%.

Hardness decrease rate (%)−(initial hardness at a relative humidity of 50%−hardness after aging at a relative humidity of 95%)/hardness at a relative humidity of 50%×100

The initial hardness and the hardness after aging is the international rubber hardness (IRHD), and are values measured using a hardness tester according to the international rubber hardness test M method specified in JIS K 6253.

Constituent Materials

Support Member

The cleaning blade of the present disclosure has a support member that supports the elastic member. The material constituting the support member is not particularly limited, and examples thereof include the following materials: metal materials such as a steel plate, a stainless steel plate, a galvanized steel sheet, and a chromium-free steel plate, and resin materials such as 6-nylon and 6,6-nylon.

In addition, the shape and structure of the support member are not particularly limited. For example, one end of the elastic member of the cleaning blade is supported by the support member as shown in FIG. 2 and the like.

Elastic Member

The elastic member comprises a polyurethane elastomer having a polysiloxane segment. The polyurethane elastomer constituting the elastic member is mainly obtained from raw materials such as a polyol, a chain extender, a crosslinking agent, a polyisocyanate, a catalyst and other additives in addition to polysiloxane.

The polyurethane elastomer is a reaction product of a urethane prepolymer and a silicone oil having a functional group that can react with an isocyanate group (or a hydroxyl group). The urethane prepolymer is a reaction product of a polyol and a polyisocyanate.

Hereinafter, raw materials for the polyurethane elastomer will be described in detail.

As the polysiloxane, various modified silicone oils having a dimethylsiloxane structure and a reactive group can be used. A carbinol-modified silicone oil is preferable. Examples thereof include carbinol-modified silicone oils whose ends are modified and carbinol-modified silicone oils whose side chains are modified. Among these, carbinol-modified silicone oils having primary hydroxyl groups at the ends are more preferable because they have high reactivity with isocyanate and can be easily fixed in a polyurethane elastomer. For example, commercially available products "KF-6001" (product name, commercially available from Shin-Etsu Chemical Co., Ltd.), "Silmer OH J10" (product name, commercially available from Siltech Corporation)" and "X-22-4039" (product name, commercially available from Shin-Etsu Chemical Co., Ltd.)" can be used.

Examples of the polyol are as follows: polyester polyols such as polyethylene adipate polyol, polybutylene adipate polyol, polyhexylene adipate polyol, (polyethylene/polypropylene) adipate polyol, (polyethylene/polybutylene) adipate polyol, and (polyethylene/polyneopentylene) adipate polyol; polycaprolactone polyols obtained by the ring-opening polymerization of caprolactone; polyether polyols such as polyethylene glycol, polypropylene glycol, and polytetramethylene glycol; and polycarbonate diols and the like. A single one of these may be used by itself or two or more may be used in combination.

Among these polyols, a polyester polyol that uses adipate is preferred because this yields a polyurethane elastomer that exhibits excellent mechanical characteristics. Polyester polyols using butylene adipate are more preferable. For example, commercially available products "NIPPOLLAN 3027" having a number average molecular weight of 2,500 (product name, commercially available from Tosoh Corporation), and "NIPPOLLAN 4010" having a number average molecular weight of 2,000 (product name, commercially available from Tosoh Corporation)" can be used. As the chain extender, glycol, tri- or higher polyhydric alcohols, and the like which can extend polyurethane elastomer chains can be used.

The glycol can be exemplified by the following: ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol.

Examples of tri- or higher polyhydric alcohols include trimethylolpropane, glycerin, pentaerythritol, and sorbitol. These may be used alone or two or more thereof may be used in combination. It is preferable to use these tri- or higher polyhydric alcohols as a crosslinking agent. Among the above polyhydric alcohols, trimethylolpropane is more preferable.

The polyisocyanate can be exemplified by the following: 4,4'-diphenylmethane diisocyanate (4,4'-MDI), polymeric MDI (pMDI), 2,4-tolylene diisocyanate (2,4-TDI), 2,6-tolylene diisocyanate (2,6-TDI), xylene diisocyanate (XDI), 1,5-naphthalene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), and carbodiimide-modified MDI. Among the above polyisocyanates, 4,4'-MDI which has high reactivity and in which two isocyanate groups have equal reactivity is preferable.

Those catalysts generally used for the curing of polyurethane elastomers can be used as the aforementioned catalyst. Tertiary amine catalysts and the like are examples of this catalyst, and the following are specific examples: aminoalcohols such as dimethylethanolamine, N,N,N'-trimethylaminopropylethanolamine, and N,N'-dimethylhexanolamine; trialkylamines such as triethylamine; tetraalkyldiamines such as N,N,N',N'-tetramethyl-1,3-butanediamine; triethylenediamine; piperazine compounds; and triazine compounds. The organic acid salts of metals can also be used, e.g., potassium acetate and alkali potassium octylate. The metal catalysts generally used for urethanations, for example, dibutyltin dilaurate, can also be used. A single one of these may be used alone or two or more may be used in combination.

As the catalyst, N,N'-dimethylhexanolamine is preferable. Examples thereof include commercially available products Kaolizer No. 25 (product name, commercially available from Kao Corporation) and the like. In addition, a solution of potassium acetate in ethylene glycol is also preferable. Examples thereof include commercially available products POLYCAT46 (product name, commercially available from Air Products Japan, K.K.) and the like.

For example, the polyurethane elastomer preferably comprises, as constituent components, at least one polyol selected from the group consisting of polyester polyols and polyether polyols, a tri- or higher polyhydric alcohol, and 4,4'-MDI. Additives, e.g., pigments, plasticizers, waterproofing agents, oxidation inhibitors, ultraviolet absorbers, photostabilizers, and so forth, may be blended on an optional basis into the starting materials for the elastic member.

Method of Producing Cleaning Blade

A method of producing a cleaning blade according to the present disclosure is not particularly limited, and an appropriate method may be selected from among known methods.

A method of producing an elastic member comprising a polyurethane elastomer is not particularly limited, and preferably includes, for example, the following steps. A polyurethane elastomer composition is preferably prepared by a prepolymer method using prepolymers having as uniform molecular weight distribution as possible. The method preferably first includes a step of reacting a polyol with a polyisocyanate to obtain a prepolymer. The NCO content in the prepolymer is not particularly limited, and is preferably 3.00 to 15.00 mass %, and more preferably 6.00 to 10.00 mass %.

Subsequently, a mixture (curing agent) of a polysiloxane, a crosslinking agent and a catalyst is added to the obtained prepolymer and mixed to obtain a polyurethane elastomer composition. A polyol may be added to the curing agent.

After the support member is arranged in a mold for forming a cleaning blade, the polyurethane elastomer composition is injected into the cavity, heated and cured, and thereby a cleaning blade in which the plate-shaped blade member and the support member are integrated can be obtained. A known release agent may be applied to the mold. The following method can also be used: a polyurethane elastomer sheet can be separately molded from the aforementioned polyurethane starting material composition, this can be cut into a strip to give the elastic member, the bonding region of the elastic member can be overlaid on the support member, on which an adhesive has been coated or attached, and bonding can be carried out by the application of heat and pressure.

In addition, the polyurethane elastomer composition can also be used as the material for a urethane molded product. For example, the polyurethane elastomer composition can be injected into a sheet mold, cured and then demolded to form a urethane molded product.

Process Cartridge and Electrophotographic Image Forming Apparatus

The cleaning blade can be used by being incorporated into a process cartridge that is detachable from the electrophotographic image forming apparatus. Specifically, for example, in a process cartridge including an image bearing member as a to-be-cleaned member and a cleaning blade arranged to be able to clean the surface of the image bearing member, the cleaning blade according to this aspect can be used as the cleaning blade. The process cartridge contributes to stable formation of high-quality electrophotographic images.

In addition, the electrophotographic image forming apparatus according to one aspect of the present invention comprises an image bearing member such as a photosensitive member and a cleaning blade arranged to be able to clean the surface of the image bearing member, and the cleaning blade is the cleaning blade according to this aspect. The electrophotographic image forming apparatus can stably form high-quality electrophotographic images.

EXAMPLES

The present invention will be described below with reference to production examples, examples and comparative examples, but the present disclosure is not limited to these examples. Reagents or industrial chemicals were used as raw materials other than those shown in the examples and comparative examples.

In the following Examples 1 to 14 and Comparative Examples 1 to 5, integrally molded cleaning blades shown in FIG. 1 were produced and evaluated. Tables 1 and 2 show the formulations of polyurethane elastomer compositions of examples and comparative examples, and physical properties and evaluation results of the obtained elastic members.

Example 1

Support Member

A galvanized steel sheet with a thickness of 1.6 mm was prepared and processed to obtain a support member with an L-shaped cross section, as indicated by reference number 3 in FIG. 2.

Here, a urethane-metal single-layer adhesive agent (product name; Chemlok 219, commercially available from LORD Corporation) was applied to the portion of the support member that was in contact with the elastic member.

Preparation of Raw Materials for Elastic Member

Prepolymer

As an isocyanate, 4,4'-diphenylmethane diisocyanate (product name: Millionate MT, commercially available from Tosoh Corporation) (hereinafter referred to as 4,4'-MDI) 327.0 g As a polyol, a butylene adipate polyester polyol having a number average molecular weight of 2,500 (product name: NIPPOLLAN 3027, commercially available from Tosoh Corporation) (hereinafter referred to as PBA2500) 673.0 g The materials were reacted at 80° C. for 3 hours to obtain a prepolymer with an NCO content of 8.80 mass %.

Curing Agent

Trimethylolpropane (commercially available from Tokyo Chemical Industry Co., Ltd.) (hereinafter referred to as TMP) 84.3 g N,N'-dimethylhexanolamine (product name: Kaolizer No. 25, commercially available from Kao Corporation) (hereinafter referred to as No. 25) 0.25 g Carbinol-modified silicone oil (product name: KF-6001, commercially available from Shin-Etsu Chemical Co., Ltd.) (hereinafter referred to as KF-6001) 8.7 g The materials were mixed to prepare a curing agent.

The curing agent was mixed with the obtained prepolymer to obtain a polyurethane elastomer composition.

The support member was arranged so that the adhesive agent application portion protruded into the cavity of a mold for molding a cleaning blade. The polyurethane elastomer composition was injected into the mold for molding a cleaning blade, cured at 130° C. for 5 minutes, and then demolded to obtain an integrally molded product of the polyurethane and the support member.

As the mold, one coated with a release agent A before the polyurethane elastomer composition was injected was used. As the release agent A, a mixture of 5.06 g of ELEMENT14 PDMS 1000-JC (product name, commercially available from Momentive Performance Materials), 6.19 g of ELEMENT14 PDMS 10K-JC (product name, commercially available from Momentive Performance Materials), 3.75 g of SR1000 (product name, commercially available from Momentive Performance Materials), and 85 g of EXXSOL DSP145/160 was used.

The tip side of the polyurethane elastomer of the integrally molded product was appropriately cut to obtain a plate-shaped elastic member having a main surface and a tip surface that forms a tip side edge together with the main surface. The angle of the tip side edge was 90 degrees, and the distances of the elastic member in the short side direction, the thickness direction and the longitudinal direction were 7.5 mm, 1.8 mm, and 240 mm, respectively.

The obtained cleaning blade was evaluated by the following method.

Method of Calculating Storage Elastic Modulus

The storage elastic modulus of the elastic member was calculated by measuring a temperature frequency variance using a dynamic viscoelasticity device and creating a master curve at a reference temperature of 24° C. based on the time-temperature shift rule.

Dynamic viscoelasticity measurement conditions are as follows.

- Device: dynamic viscoelasticity measurement device (product name: DMA EXPLEXOR 500N, commercially available from NETZSCH Group)
- Measurement mode: tensile
- Static strain: 2%
- Dynamic strain: 0.5%
- Measurement temperature: −30° C. to 80° C. (2° C. increments, 56 points)
- Measurement frequency: 0.1 to 100 Hz (5 points)

From the obtained dynamic viscoelasticity measurement result, a master curve was created at a reference temperature of 24° C. using in-device software.

From the obtained master curve, mathematical approximation was performed based on the generalized Maxwell model.

The generalized Maxwell model is as follows.

$$E_r(\tau) = E_e + \sum_{i=1}^{N} E_i \exp\left(-\frac{\tau}{\tau_i}\right)$$

The generalized Maxwell model was separated into the storage elastic modulus E' and the loss elastic modulus E" as follows.

$$E'(\omega) = E_e + \sum_{i=1}^{N} \frac{E_i \tau_i^2 \omega^2}{1 + \tau_i^2 \omega_2}$$

$$E''(\omega) = \sum_{i=1}^{N} \frac{E_i \tau_i}{\lambda + \tau_i^2 \omega^2}$$

In the mathematical approximation, the number of terms in the generalized Maxwell model was set to 1 for elastic term (Ee)+20 for viscoelastic term (Ei) (i=1 to 20). 20 points were set for ti between $10^{-8}$ and $10^{5}$.

Ee and Ei were optimized by a nonlinear generalized reduced gradient (GRG) method so that the differences of E' and E" of the generalized Maxwell model with respect to E' and E" in the master curve were minimized. Specifically, the solver function of Excel was used.

From the obtained master curve approximate expression, E' (1) (E' at $1\times10^{-3}$ Hz) was calculated, and used as the storage elastic modulus of the elastic member at a vibration frequency of $1\times10^{-3}$ Hz.

Here, the measurement sample was prepared as follows.

The sample was prepared so that it included the corner (for example, tip side edge) of the portion of the elastic member that was in contact with the to-be-cleaned member. The sample was prepared by cutting it out into a strip shape with a length of 50 mm, a width of 2 mm, a thickness of 1.8 mm Measurement of T2 Relaxation Time The spin-spin relaxation time (T2) was measured by the solid echo method in pulsed NMR analysis.

The used sample was the elastic member of the cleaning blade cut from the measurement position to be described below or a urethane molded product to be described below. The sample was cut into small pieces with a size of 1 mm×1 mm, and 1 g of the cut-out pieces was put into a test tube.

Pulsed NMR measurement conditions are as follows.

- Device: JNM-MU25 (commercially available from JEOL Ltd.)
- Condition: solid echo method
- Measurement environment: 50° C.
- Number of measurements: 128

The measurement results were separated into two components by the least squares method using in-device software, and respective spin-spin relaxation times ($T2_L$ and $T2_S$) were obtained.

In the present disclosure, the obtained T2 relaxation curve was separated into two components according to the length of the relaxation time. In a specific manner, the T2 relaxation curve was separated into two components by curve fitting to the following formula, and the spin-spin relaxation time ($T2_L$) of the component with a long relaxation time and the spin-spin relaxation time ($T2_S$) of the component with a short relaxation time were calculated.

$$M(t) = A_L \exp\left[-\left(\frac{t}{T2_L}\right)^{mi}\right] + A_S \exp\left[-\left(\frac{t}{T2_S}\right)^{mi}\right]$$

- M(t): macroscopic magnetization
- $A_L$: the intensity of the component with a long relaxation time at t=0
- $T2_L$: the T2 relaxation time of the component with a long relaxation time
- $A_S$: the intensity of the component with a short relaxation time at t=0
- $T2_S$: the T2 relaxation time of the component with a short relaxation time
- mi: Weibull coefficient Measurement position: when the length of the tip side edge of the cleaning blade was L, samples were taken from the positions ⅛L, ½L, and ⅞L from one end side on the edge as described above and measured. The arithmetic average values are shown in Table 1.

FT-IR Analysis of Elastic Member by ATR Method

The values of the peak intensity at 1,415 $cm^{-1}$ and the peak intensity at 1,538 $cm^{-1}$ of the elastic member were measured by the ATR method using FT-IR.

The sample cut out from the elastic member of the cleaning blade at a measurement position to be described below was used.

FT-IR measurement conditions are as follows.

Device: FT/IR-4700 (commercially available from JASCO Corporation)

Measurement mode: ATR method (crystal: diamond)

Cumulative number of measurements: 64

Measurement position: when the length of the tip side edge of the cleaning blade was L, measurement was performed at the positions ⅛L, ½L, and ⅞L from one end side on the edge.

From the obtained peak intensities, the value of the peak intensity at 1,415 cm-1/the peak intensity at 1,538 $cm^{-1}$ was calculated, and the arithmetic average value is shown in Table 1.

Method of Measuring M1 and M2

M1 and M2 were measured by a direct sample introduction method (DI method) in which a sample was directly introduced into an ion source without passing through a gas chromatograph (GC).

The device used was POLARIS Q (commercially available from Thermo Fisher Scientific Inc.), and a direct exposure probe (DEP) was used.

Assuming that a line segment was drawn on the tip surface of the elastic member parallel to the tip side edge at a distance of 0.5 mm from the tip side edge, when the length of the line segment was L', points ⅛L', ½L', and ⅞L' from one end side on the line segment were defined as P0', P1', and P2', respectively. Polyurethane was scraped off at P0', P1' and P2' with a biocutter.

μg of the sample to be sampled at each of P0', P1' and P2' was fixed to a filament positioned at the tip of the probe and directly inserted into the ionization chamber. Then, the sample was rapidly heated from room temperature to 1,000° C. at a certain ramp rate (10° C./s), and the vaporized gas was detected by a mass spectrometer.

As the amount M1 of all ions detected, the sum value of integrated intensities of all peaks in the obtained total ion current thermogram was used.

The integrated intensity of the peak of the extracted ion thermogram corresponding to the m/z value in a range of 380.5 to 381.5 derived from the polymeric MDI was defined as M2, and M2/M1 was calculated. Here, the arithmetic average value of the values obtained at each of P0', P1' and P2' was taken as the value of M2/M1 in the present disclosure.

Evaluation of Moisture Absorption Rate

A piece with a width of 7.5 mm×a length of 30 mm, and a thickness of 1.8 mm was cut out from the center of the elastic member of the cleaning blade, and left in an environment at a temperature of 24° C. and a relative humidity of 50% for 24 hours or longer, and the initial weight was then measured. The 30 mm length of the piece was a part of the cleaning blade in the longitudinal direction.

Next, the sample was moved to an environment at a temperature of 24° C. and a relative humidity of 95% and left for 24 hours or longer, the weight after aging was then measured, and the moisture absorption rate was calculated by the following formula.

Moisture absorption rate (%)=(weight after aging at a relative humidity of 95%−initial weight at a relative humidity of 50%)/initial weight at a relative humidity of 50%×100

Evaluation of Hardness Decrease Rate

A piece with a width of 7.5 mm×a length of 10 mm, and a thickness of 1.8 mm was cut out from the center of the elastic member of the cleaning blade and left in an environment at a temperature of 24° C. and a relative humidity of 50% for 24 hours or longer, and the initial hardness (IRHD) was then measured under the following conditions. The 30 mm length of the piece was a part of the cleaning blade in the longitudinal direction.

Device: Wallace hardness tester (commercially available from Wallace Instruments)

Condition: international rubber hardness test M method specified in JIS K 6253

Hardness: international rubber hardness (IRHD)

Next, the sample was moved to an environment at a temperature of 24° C. and a relative humidity of 95% and left for 24 hours or longer, the hardness after aging was then measured under the same conditions as above, and the hardness decrease rate was calculated by the following formula.

Hardness decrease rate (%)=(initial hardness at a relative humidity of 50%−hardness after aging at a relative humidity of 95%)/hardness at a relative humidity of 50%×100

Evaluation of Cleaning Performance

The motor of a color laser beam printer (product name; HP Color LaserJet Enterprise 5700dn, commercially available from HP Inc.) was modified to double the driving speed. The cleaning blade obtained by the above method was incorporated into the cyan cartridge of the printer as a cleaning blade of the photosensitive member, which is a to-be-cleaned member. In addition, the toner in a developing machine of the cyan cartridge was replaced entirely with a toner 1 to be described below.

Next, the printer was left in a high humidity environment (a temperature of 24° C. and a relative humidity of 95%) for 24 hours and then moved to an environment at a temperature of 24° C. and a relative humidity of 80%, and images were formed on 10 k sheets. After images were formed on 10 k sheets, halftone images were output as evaluation images, it was visually checked whether image defects (streaks on the image) caused by the cleaning blade occurred, and the images were evaluated.

A: no image defects occurred.

B: image defects occurred.

Method of Producing Toner 1

As the evaluation toner, the toner 1 produced by the following method was used. Here, in the following, all "parts" are based on mass, unless otherwise specified.

Step of Preparing Aqueous Medium 1

650.0 parts of deionized water was put into a reaction container including a stirrer, a thermometer, and a reflux tube, 14.0 parts of sodium phosphate (12-hydrate commercially available from Rasa Industries, Ltd.) was added, and the mixture was kept at 65° C. for 1.0 hour while purging with nitrogen. Using a T.K. homomixer (commercially available from Tokushu Kika Kogyo Co., Ltd.), while stirring at 15,000 rpm, a calcium chloride aqueous solution in which 9.2 parts of calcium chloride (dihydrate) was dissolved in 10.0 parts of deionized water was added at once to prepare an aqueous medium containing a dispersion stabilizer. In addition, 10 mass % hydrochloric acid was added to the aqueous medium, the pH was adjusted to 5.0, and thereby an aqueous medium 1 was obtained.

Step of Preparing Polymerizable Monomer Composition

Styrene: 60.0 parts

C.I. pigment blue 15:3 6.5 parts

The materials were added to an attritor (commercially available from Mitsui Miike Machinery Co., Ltd.) and additionally dispersed using zirconia particles with a diameter of 1.7 mm at 220 rpm for 5.0 hours to prepare a pigment-dispersed solution. The following materials were added to the pigment-dispersed solution.

Styrene: 20.0 parts n-Butyl acrylate 20.0 parts

Crosslinking agent (divinylbenzene) 0.3 parts

Saturated polyester resin 5.0 parts (Polycondensation product of propylene oxide modified bisphenol A (2-mol adduct) and terephthalic acid (a molar ratio of 10:12), glass transition temperature Tg=68° C., weight average molecular weight Mw=10,000, molecular weight distribution Mw/Mn=5.12).

Fischer-Tropsch wax (with a melting point of 78° C.) 7.0 parts

These materials were kept at 65° C. and uniformly dissolved and dispersed using a T.K. homomixer (commercially available from Tokushu Kika Kogyo Co., Ltd.) at 500 rpm to prepare a polymerizable monomer composition.

Granulation Step

While maintaining the temperature of the aqueous medium 1 at 70° C., and the rotation speed of the T.K. homomixer at 15,000 rpm, the polymerizable monomer composition was added to the aqueous medium 1, and 10.0 parts of t-butyl peroxypivalate as a polymerization initiator was added. Granulation was directly performed for 10 minutes while maintaining 15,000 rpm with the stirring device.

Polymerization and Distillation Step

After the granulation step, the stirrer was replaced with a propeller stirring blade, polymerization was performed for 5.0 hours while stirring at 150 rpm and maintaining 70° C., the temperature was raised to 85° C. and heating was performed for 2.0 hours to cause a polymerization reaction.

Then, the reflux tube of the reaction container was replaced with a cooling tube, the slurry was heated to 100° C., distillation was performed for 6 hours, and unreacted polymerizable monomers were distilled off to obtain a toner base particle dispersed solution.

Polymerization of Organosilicon Compound 60.0 parts of deionized water was weighed out into a reaction container including a stirrer and a thermometer, and the pH was adjusted to 4.0 µsing 10 mass % hydrochloric acid. This was heated while stirring, and the temperature reached 40° C.

Then, 40.0 parts of methyltriethoxysilane as an organosilicon compound was added, and the mixture was stirred for 2 hours or longer to perform hydrolysis. The end point of the hydrolysis was visually checked when oil and water were no longer separated and remained in a single layer, and cooling was performed to obtain a hydrolysis solution comprising the organosilicon compound.

The temperature of the obtained toner base particle dispersed solution was cooled to 55° C., and 25.0 parts of the organosilicon compound hydrolysis solution was then added to initiate polymerization of the organosilicon compound. After the mixture was maintained for 15 minutes without change, the pH was adjusted to 5.5 µsing a 3.0 mass % sodium bicarbonate aqueous solution. The mixture was maintained at 55° C. for 60 minutes while continuing stirring, the pH was then adjusted to 9.5 µsing a 3.0 mass % sodium bicarbonate aqueous solution, and the mixture was additionally maintained for 240 minutes to obtain a toner particle-dispersed solution.

Washing and Drying Step

After the polymerization step was completed, the toner particle-dispersed solution was cooled, hydrochloric acid was added to the toner particle-dispersed solution, the pH was adjusted to 1.5 or less, and the mixture was stirred and left for 1 hour and then subjected to solid-liquid separation using a pressure filter to obtain a toner cake. This was re-slurried using deionized water to make a dispersed solution again, and the mixture was then subjected to solid-liquid separation using the above filter to obtain a toner cake.

The obtained toner cake was dried in a thermostatic chamber at 40° C. and classified for 72 hours to obtain a toner 1.

Examples 2 to 14 and Comparative Examples 1 to 5

Prepolymers, curing agents and polysiloxanes were prepared and mixed in the same manner as in Example 1 except that formulation materials and amounts thereof were changed as shown in Tables 1 and 2, and thereby polyurethane elastomer compositions were obtained. Cleaning blades were prepared using the obtained polyurethane elastomer compositions, and the obtained cleaning blades were evaluated in the same manner as in Example 1. The evaluation results are shown in Tables 1 and 2.

Details of materials used other than those shown in Example 1 are shown below.

Polybutylene adipate polyester polyol having a number average molecular weight of 2,000 (product name: NIPPOLLAN 4010, commercially available from Tosoh Corporation) (hereinafter referred to as PBA2000)

Polyhexylene adipate polyester polyol having a number average molecular weight of 1,000 (product name: NIPPOLLAN 164, commercially available from Tosoh Corporation) (hereinafter referred to as PHA1000)

Polymeric MDI (product name: Millionate MR-400, commercially available from Tosoh Corporation) (hereinafter referred to as pMDI)

1,4-butanediol (commercially available from Tokyo Chemical Industry Co., Ltd.) (hereinafter referred to as 1,4-BD)

POLYCAT46 (commercially available from Air Products Japan, K.K.) (hereinafter referred to as PC46)

Silmer OH J10 (commercially available from Siltech Corporation)

X-22-4039 (commercially available from Shin-Etsu Chemical Co., Ltd.)

KF-96A-100cs (commercially available from Shin-Etsu Chemical Co., Ltd.)

In Comparative Example 1, since no siloxane component was comprised, the moisture absorption reduction effect was small, and image defects occurred. In Comparative Example 2, although the siloxane component was comprised, since it was not fixed in the polyurethane elastomer, the moisture absorption reduction effect was small and image defects occurred. In Comparative Example 3, although the siloxane segment was comprised, since $T2_L$ was large and the crosslink density was small, the moisture absorption reduction effect was small and image defects occurred. In Comparative Example 4, since the storage elastic modulus was small, the contact force was small and image defects occurred. In Comparative Example 5, since the storage elastic modulus was large, nip formation was unstable, and image defects occurred.

Example 15

A polyurethane elastomer composition having the same formulation as in Example 9 was injected into a sheet mold with a thickness of 2 mm and cured at 130° C. for 5 minutes, and then demolded to obtain a urethane molded product with a thickness of 2 mm. Here, as the sheet mold, one coated with the above release agent A before the polyurethane elastomer composition was injected was used.

The moisture absorption rate and the hardness decrease rate of the obtained urethane molded product were measured in the same manner as in Example 1. The evaluation results are shown in Table 3.

TABLE 1

| | | | | Example 1 | Example 2 | Example 3 | Example 4 | Example 5 |
|---|---|---|---|---|---|---|---|---|
| Composition | Prepolymer | 4,4'-MDI | Addition amount (g) | 327 | 327 | 327 | 327 | 327 |
| | | pMDI | Addition amount (g) | 0 | 0 | 0 | 0 | 0 |
| | | Polyol | Type | PBA2500 | PBA2500 | PBA2500 | PBA2500 | PBA2500 |
| | | | Addition amount (g) | 673 | 673 | 673 | 673 | 673 |
| | Curing agent | 1.4-BD | Addition amount (g) | 0 | 0 | 0 | 0 | 0 |
| | | TMP | Addition amount (g) | 84.3 | 84.3 | 84.3 | 84.3 | 84.3 |
| | | Polyol | Type | — | — | — | — | — |
| | | | Addison amount (g) | 0 | 0 | 0 | 0 | 0 |
| | | No. 25 | Addition amount (g) | 0.25 | 0.25 | 0.25 | 0.25 | 0.25 |
| | | PC46 | Addition amount (g) | 0 | 0 | 0 | 0 | 0 |
| | | KF-6001 | Addition amount (g) | 8.7 | 57 | 147.8 | 0 | 0 |
| | | Silmer OH J10 | Addition amount (g) | 0 | 0 | 0 | 0 | 0 |
| | | X-22-4039 | Addition amount (g) | 0 | 0 | 0 | 8.7 | 57 |
| | | KF-96A-100cs | Addition amount (g) | 0 | 0 | 0 | 0 | 0 |
| Elastic modulus | Storage elastic modulus at $1 \times 10^{-3}$ Hz (Mpa) | | | 16.1 | 14.8 | 13.2 | 16 | 14.8 |
| Pulsed NMR | $T2_L$(μs) | | | 286 | 288 | 285 | 283 | 287 |
| Structure | m in Formula (2) | | | 0 | 0 | 0 | 4 | 4 |
| Amount of siloxane | Content of the structure represented by Formula (1) (mass %) | | | 0.8 | 5 | 12 | 0.8 | 6 |
| IR | 1415 $cm^{-1}$/1538 $cm^{-1}$ | | | 0.56 | 0.57 | 0.55 | 0.56 | 0.55 |
| Mass spectrometry | M2/M1 | | | 0 | 0 | 0 | 0 | 0 |
| Hardness | IRHD | | | 74.2 | 73.8 | 73.4 | 74.1 | 73.8 |
| Evaluation | Mositure absorption rate (%) | | | 0.84 | 0.58 | 0.76 | 0.64 | 0.41 |
| | Hardness decrease rate (%) | | | 0.82 | 0.60 | 0.73 | 0.66 | 0.39 |
| | Cleaning performance evaluation | | | A | A | A | A | A |

| | | | | Example 6 | Example 7 | Example 8 | Example 9 | Example 10 |
|---|---|---|---|---|---|---|---|---|
| Composition | Prepolymer | 4,4'-MDI | Addition amount (g) | 327 | 327 | 327 | 327 | 327 |
| | | pMDI | Addition amount (g) | 0 | 0 | 0 | 0 | 0 |
| | | Polyol | Type | PBA2500 | PBA2500 | PBA2500 | PBA2500 | PBA2500 |
| | | | Addition amount (g) | 673 | 673 | 673 | 673 | 673 |
| | Curing agent | 1.4-BD | Addition amount (g) | 0 | 0 | 0 | 0 | 0 |
| | | TMP | Addition amount (g) | 84.3 | 84.3 | 84.3 | 84.3 | 84.3 |
| | | Polyol | Type | — | — | — | — | — |
| | | | Addison amount (g) | 0 | 0 | 0 | 0 | 0 |
| | | No. 25 | Addition amount (g) | 0.25 | 0.25 | 0.25 | 0.25 | 0.25 |
| | | PC46 | Addition amount (g) | 0 | 0 | 0 | 0 | 0 |
| | | KF-6001 | Addition amount (g) | 0 | 0 | 0 | 0 | 0 |

TABLE 1-continued

| | | | | | | | |
|---|---|---|---|---|---|---|---|
| | Silmer OH J10 | Addition amount (g) | 0 | 8.7 | 11 | 57 | 120.4 |
| | X-22-4039 | Addition amount (g) | 147.8 | 0 | 0 | 0 | 0 |
| | KF-96A-100cs | Addition amount (g) | 0 | 0 | 0 | 0 | 0 |
| Elastic modulus | Storage elastic modulus at $1 \times 10^{-3}$ Hz (Mpa) | | 13.3 | 15.9 | 15.7 | 14.6 | 13.2 |
| Pulsed NMR | $T2_L$(μs) | | 285 | 288 | 285 | 283 | 286 |
| Structure | m in Formula (2) | | 4 | 10 | 10 | 10 | 10 |
| Amount of siloxane | Content of the structure represented by Formula (1) (mass %) | | 12 | 0.8 | 1 | 5 | 10 |
| IR | 1415 $cm^{-1}$/1538 $cm^{-1}$ | | 0.58 | 0.56 | 0.57 | 0.56 | 0.55 |
| Mass spectrometry | M2/M1 | | 0 | 0 | 0 | 0 | 0 |
| Hardness | IRHD | | 73.3 | 74.1 | 74 | 73.6 | 73.2 |
| Evaluation | Mositure absorption rate (%) | | 0.57 | 0.63 | 0.48 | 0.40 | 0.38 |
| | Hardness decrease rate (%) | | 0.58 | 0.62 | 0.46 | 0.41 | 0.39 |
| | Cleaning performance evaluation | | A | A | A | A | A |

In the table, the content of the structure represented by Formula (1) indicates the content (mass %) of the structure represented by Formula (1) in the polyurethane elastomer. In addition, the value of m in Formula (2) being 0 indicates that the polyurethane elastomer had no structure represented by Formula (2). The hardness (IRHD) indicates the hardness (initial hardness) after the elastic member was left in an environment at a temperature of 24° C. and a relative humidity of 50% for 24 hours.

TABLE 2

| | | | | Example 11 | Example 12 | Example 13 | Example 14 | Comparative Example 1 |
|---|---|---|---|---|---|---|---|---|
| Composition | Prepolymer | 4,4'-MDI | Addition amount (g) | 327 | 317 | 344 | 327 | 327 |
| | | pMDI | Addition amount (g) | 0 | 10 | 0 | 0 | 0 |
| | | Polyol | Type | PBA2500 | PBA2500 | PBA2000 | PBA2500 | PBA2500 |
| | | | Addition amount (g) | 673 | 673 | 656 | 673 | 673 |
| | Curing agent | 1.4-BD | Addition amount (g) | 0 | 0 | 0 | 12.9 | 12.9 |
| | | TMP | Addition amount (g) | 84.3 | 77.4 | 84.3 | 23.7 | 23.7 |
| | | Polyol | Type | — | PHA1000 | — | PHA1000 | PHA1000 |
| | | | Addison amount (g) | 0 | 77.4 | 0 | 168 | 168 |
| | | No. 25 | Addition amount (g) | 0.25 | 0.46 | 0.25 | 0.35 | 0.35 |
| | | PC46 | Addition amount (g) | 0 | 0 | 0 | 0.08 | 0.08 |
| | | KF-6001 | Addition amount (g) | 0 | 60.8 | 57 | 63.4 | 0 |
| | | Silmer OH J10 | Addition amount (g) | 147.8 | 0 | 0 | 0 | 0 |
| | | X-22-4039 | Addition amount (g) | 0 | 0 | 0 | 0 | 0 |
| | | KF-96A-100cs | Addition amount (g) | 0 | 0 | 0 | 0 | 0 |
| Elastic modulus | Storage elastic modulus at $1 \times 10^{-3}$ Hz (Mpa) | | | 12.9 | 12.1 | 16.6 | 12.8 | 14 |
| Pulsed NMR | $T2_L$(μs) | | | 287 | 312 | 258 | 336 | 334 |
| Structure | m in Formula (2) | | | 10 | 0 | 0 | 0 | 0 |
| Amount of siloxane | Content of the structure represented by Formula (1) (mass %) | | | 12 | 5 | 5 | 5 | 0 |
| IR | 1415 $cm^{-1}$/1538 $cm^{-1}$ | | | 0.57 | 0.57 | 0.55 | 0.8 | 0.8 |
| Mass spectrometry | M2/M1 | | | 0 | 0.0006 | 0 | 0 | 0 |
| Hardness | IRHD | | | 73 | 73.2 | 74.8 | 73.4 | 73.6 |
| Evaluation | Mositure absorption rate (%) | | | 0.58 | 0.59 | 0.57 | 0.78 | 1.06 |
| | Hardness decrease rate (%) | | | 0.58 | 0.60 | 0.57 | 0.78 | 1.08 |
| | Cleaning performance evaluation | | | A | A | A | A | B |

TABLE 2-continued

| | | | | Comparative Example 2 | Comparative Example 3 | Comparative Example 4 | Comparative Example 5 |
|---|---|---|---|---|---|---|---|
| Composition | Prepolymer | 4,4'-MDI | Addition amount (g) | 327 | 327 | 327 | 354 |
| | | pMDI | Addition amount (g) | 0 | 0 | 0 | 10 |
| | | Polyol | Type | PBA2500 | PBA2500 | PBA2500 | PBA2000 |
| | | | Addition amount (g) | 673 | 673 | 673 | 656 |
| | Curing agent | 1.4-BD | Addition amount (g) | 12.9 | 23.7 | 0 | 0 |
| | | TMP | Addition amount (g) | 23.7 | 12.9 | 75.4 | 84.3 |
| | | Polyol | Type | PHA1000 | PHA1000 | PHA1000 | — |
| | | | Addison amount (g) | 168 | 168 | 82.4 | 0 |
| | | No. 25 | Addition amount (g) | 0.35 | 0.35 | 0.46 | 0.25 |
| | | PC46 | Addition amount (g) | 0.08 | 0.08 | 0 | 0.08 |
| | | KF-6001 | Addition amount (g) | 0 | 0 | 0 | 0 |
| | | Silmer OH J10 | Addition amount (g) | 0 | 63.4 | 60.8 | 57 |
| | | X-22-4039 | Addition amount (g) | 0 | 0 | 0 | 0 |
| | | KF-96A-100cs | Addition amount (g) | 50 | 0 | 0 | 0 |
| Elastic modulus | Storage elastic modulus at $1 \times 10^{-3}$ Hz (Mpa) | | | 13.7 | 13.8 | 11.8 | 18.2 |
| Pulsed NMR | $T2_L$(μs) | | | 336 | 368 | 312 | 258 |
| Structure | m in Formula (2) | | | 0 | 10 | 10 | 10 |
| Amount of siloxane | Content of the structure represented by Formula (1) (mass %) | | | 0 | 5 | 5 | 5 |
| IR | 1415 $cm^{-1}$/1538 $cm^{-1}$ | | | 0.8 | 0.77 | 0.57 | 0.55 |
| Mass spectrometry | M2/M1 | | | 0 | 0 | 0 | 0.0006 |
| Hardness | IRHD | | | 73.3 | 74.3 | 73.1 | 74.8 |
| Evaluation | Mositure absorption rate (%) | | | 1.06 | 1.12 | 0.61 | 0.59 |
| | Hardness decrease rate (%) | | | 1.08 | 1.11 | 0.62 | 0.59 |
| | Cleaning performance evaluation | | | B | B | B | B |

TABLE 3

| | | | | Example 15 |
|---|---|---|---|---|
| Composition | Prepolymer | MDI | Addition amount (g) | 327 |
| | | Polyol | Type | PBA2500 |
| | | | Addition amount (g) | 673 |
| | Curing agent | TMP | Addition amount (g) | 84.3 |
| | | No. 25 | Addition amount (g) | 0.25 |
| | | Silmer OH J10 | Addition amount (g) | 57 |
| Elasto modulus | Storage elastic modulus at $1 \times 10^{-3}$ Hz (Mpa) | | | 14.6 |
| Pulsed NMR | $T2_L$(μs) | | | 283 |
| Structure | m in Formula (2) | | | 10 |
| Amount of siloxane | Content of the structure represented by Formula (1) (mass %) | | | 5 |
| IR | 1415 $cm^{-1}$/1538 $cm^{-1}$ | | | 0.56 |
| Mass spectrometry | M2/M1 | | | 0 |
| Hardness | IRHD | | | 73.6 |
| Evaluation | Mositure absorption rate (%) | | | 0.40 |
| | Hardness decrease rate (%) | | | 0.41 |

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-084837, filed May 24, 2024, which is hereby incorporated by reference herein in its entirety.

What is claimed is:

1. An electrophotographic cleaning blade comprising:

an elastic member comprising a polyurethane, and a support member that supports the elastic member, wherein the electrophotographic cleaning blade cleans a surface of a to-be-cleaned member by bringing a part of the elastic member into contact with the surface of the to-be-cleaned member that is moving, wherein, in an environment at 24° C., a storage elastic modulus of the elastic member at a vibration frequency of $1\times10^{-3}$ Hz is 12.0 to 18.0 MPa, wherein, in a pulse NMR measurement in an environment at 50° C. of a sample sampled from the elastic member, there is a segment with a spin-spin relaxation time ($T2_L$) of 250 to 360 μs, wherein the polyurethane comprises a polyurethane elastomer, wherein the polyurethane elastomer comprises a polysiloxane segment having a structure represented by the formula (1), wherein the polysiloxane segment is bonded to a structure comprising a polyurethane skeleton in the polyurethane elastomer, and wherein a number I of structures represented by the formula (1) per one polysiloxane segment is 7 to 195:

(1)

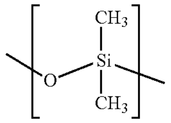

2. The electrophotographic cleaning blade according to claim 1, wherein the polysiloxane segment is bonded to the polyurethane skeleton via a structure represented by formula (2), and wherein a number m of structures represented by the formula (2) per one polysiloxane segment is 1 to 10:

(2)

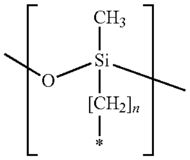

wherein, in the Formula (2), n is an integer of 1 to 5, and "*" indicates a binding segment with the polyurethane skeleton.

3. The electrophotographic cleaning blade according to claim 2, wherein the m is an integer of 2 to 10.

4. The electrophotographic cleaning blade according to claim 1, wherein, in the pulse NMR measurement, there is a segment with a spin-spin relaxation time ($T2_L$) of 250 to 320 μs.

5. The electrophotographic cleaning blade according to claim 1, wherein the polyurethane elastomer comprises 0.5 to 15 mass % of the structure represented by the formula (1).

6. The electrophotographic cleaning blade according to claim 1, wherein the polysiloxane segment has a structure in which a polysiloxane having a structure represented by following the formula (3) is urethane-bonded:

(3)

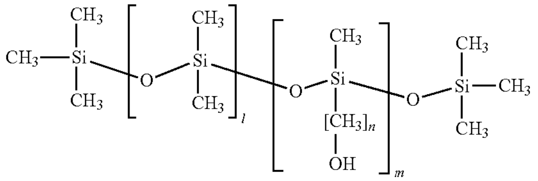

wherein, in the formula (3), I and m are an average number of moles added, I is 7 to 195, m is 1 to 10, n is an integer of 1 to 5, and siloxane structures represented by (—O—$Si(CH_3)_2$—) and structures represented by (—O—$Si(CH_3)((CH_2)_nOH)$—) may be arranged in a block copolymerization or random copolymerization manner.

7. The electrophotographic cleaning blade according to claim 1, wherein, in an FT-IR measurement of the elastic member using diamond as ATR crystals, a value of a ratio of a peak intensity at 1,415 $cm^{-1}$ to a peak intensity at 1,538 $cm^{-1}$ is 0.50 to 0.65.

8. The electrophotographic cleaning blade according to claim 1, wherein, when a side of the electrophotographic cleaning blade that comes into contact with the surface of the to-be-cleaned member is defined as a tip side of the electrophotographic cleaning blade, the elastic member has a plate shape having, at least on the tip side, a main surface that faces the to-be-cleaned member and a tip surface that forms a tip side edge together with the main surface, wherein, assuming that a third line segment is drawn on the tip surface parallel to the tip side edge at a distance of 0.5 mm from the tip side edge, a length of the third line segment is denoted as L', and points ⅛L', ½L', and ⅞L' from one end side on the third line segment are denoted as P0', P1', and P2', respectively, and wherein, when samples sampled at each of P0', P1' and P2' are heated and vaporized in an ionization chamber, and heated to 1,000° C. at a ramp rate of 10° C./s using a direct sample introduction type mass spectrometer that ionizes sample molecules, and an amount of all ions detected, which is obtained as a result, is denoted as M1, and an integrated intensity of a peak of an extracted ion thermogram corresponding to an m/z value in a range of 380.5 to 381.5 derived from polymeric diphenylmethane diisocyanate is denoted as M2, M2/M1 is less than 0.0010.

9. A process cartridge comprising the electrophotographic cleaning blade according to claim 1 and a to-be-cleaned member.

10. An electrophotographic image forming apparatus comprising the electrophotographic cleaning blade according to claim 1 and a to-be-cleaned member.

11. A urethane molded product comprising polyurethane, wherein a storage elastic modulus of the polyurethane at a vibration frequency of $1\times10^{-3}$ Hz in an environment at 24° C. is 12.0 to 18.0 MPa, wherein in a pulse NMR measurement in an environment at 50° C. of a sample sampled from the urethane molded product, there is a segment with a spin-spin relaxation time ($T2_L$) of 250 to 360 μs, wherein the polyurethane comprises a polyurethane elastomer, wherien the polyurethane elastomer comprises a polysiloxane segment having a structure represented by formula (1), wherein the polysiloxane segment is bonded to a structure comprising a polyurethane skeleton in the polyurethane elastomer, and wherein a number I of structures represented by the formula (1) per one polysiloxane segment is 7 to 195:

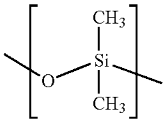

(1)

12. The urethane molded product according to claim 11, wherein the polysiloxane segment is bonded to the polyurethane skeleton via a structure represented by following formula (2), and a number m of structures represented by the formula (2) per one polysiloxane segment is 1 to 10:

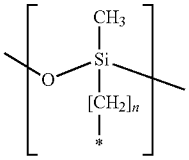

(2)

wherein, in the formula (2), n is an integer of 1 to 5, and "*" indicates a binding segment with the polyurethane skeleton.

* * * * *